(12) United States Patent
Smirnov et al.

(10) Patent No.: US 8,160,833 B2
(45) Date of Patent: Apr. 17, 2012

(54) THERMAL MASS FLOW SENSOR WITH IMPROVED RESPONSE ACROSS FLUID TYPES

(75) Inventors: Alexei V. Smirnov, Fort Collins, CO (US); Michael Lynn Westra, Windsor, CO (US); Dax Widener, Windsor, CO (US)

(73) Assignee: Hitachi Metals, Ltd, Tokyo (JP)

(*) Notice: Subject to any disclaimer, the term of this patent is extended or adjusted under 35 U.S.C. 154(b) by 351 days.

(21) Appl. No.: 12/502,918

(22) Filed: Jul. 14, 2009

(65) Prior Publication Data

US 2011/0015791 A1    Jan. 20, 2011

(51) Int. Cl.
*G06F 1/00* (2006.01)
*F16K 31/12* (2006.01)
*G05D 7/00* (2006.01)

(52) U.S. Cl. ............ 702/100; 73/861; 137/486; 700/282
(58) Field of Classification Search .................. 702/100, 702/50; 700/28, 37, 282; 73/861, 861.356; 137/488, 486
See application file for complete search history.

(56) References Cited

U.S. PATENT DOCUMENTS

| 7,073,392 B2* | 7/2006 | Lull et al. .......................... 73/861 |
| 7,434,477 B2* | 10/2008 | Lull et al. .......................... 73/861 |
| 7,603,186 B2* | 10/2009 | Smirnov .......................... 700/37 |
| 2007/0179728 A1 | 8/2007 | Kanke et al. |

FOREIGN PATENT DOCUMENTS

| WO | 0104716 A1 | 1/2001 |
| WO | 2004010234 A2 | 1/2004 |
| WO | 2008109339 A2 | 9/2008 |

OTHER PUBLICATIONS

Fellew, Matthew, "PCT International Search Report and Written Opinion re Application No. PCT/US10/041977 dated Nov. 11, 2010", Published in: AU.
Lindner, Nora, "International Preliminary Report on Patentability re Application No. PCT/US2010/041977", Jan. 26, 2012, Published in: CH.

* cited by examiner

*Primary Examiner* — Bryan Bui
(74) *Attorney, Agent, or Firm* — Sean R. O'Dowd; Neugeboren O'Dowd PC

(57) ABSTRACT

One embodiment of the present invention comprises a mass flow controller. The mass flow controller may comprise a pair of thermal sensing elements, a bridge circuit adapted to receive at least one first signal from the pair of thermal sensing elements and a differential amplifier adapted to (i) receive at least one bridge signal from the bridge circuit, and (ii) emit an output signal generally proportional to a flow rate of fluid passing through the mass flow controller. The mass flow controller is also comprised in one embodiment of a filter portion of a control module having one or more first filters comprising substantially permanent parameters adapted to provide a more accurate output signal for a baseline fluid upon a change in the flow rate and one or more second filters comprising variable parameters, with each of the one or more second filters being adapted to provide a more accurate output signal for non-baseline fluids upon a change in the flow rate.

21 Claims, 7 Drawing Sheets

THERMAL MASS FLOW SENSOR WITH IMPROVED RESPONSE ACROSS FLUID TYPES

FIELD OF THE INVENTION

The present invention generally relates to thermal mass flow sensors. In particular, but not by way of limitation, the present invention relates to mass flow controller thermal sensors and methods for operating the same for improved response across fluid types.

BACKGROUND OF THE INVENTION

In many instances, a single mass flow controller (MFC) may be used in various types of applications. Different fluids (e.g., gasses) may be applied to the mass flow controller across the applications. Therefore, it is beneficial that mass flow controllers are configured to be accurate when used with multiple fluid types.

MFC's contain thermal flow sensors which are adapted to provide a signal generally proportional to the mass flow rate of the fluid flowing through the mass flow controller. Many mass flow controller applications operate properly when the thermal sensor is adapted to provide quick and accurate responses to changes in fluid flow. When the thermal sensor provides an output signal indicative of a flow rate which either lags behind the actual flow rate upon a flow rate change, or which provides a measured flow rate that overshoots, undershoots, or oscillates about the actual flow rate upon a flow rate change, the applications often do not operate at a level needed for proper execution.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention are adapted to provide quick and accurate flow rate signals across multiple fluid types. One embodiment of the present invention is comprised of a mass flow controller (MFC). One mass flow controller is comprised of a pair of thermal sensing elements, a bridge circuit adapted to receive at least one first signal from the pair of thermal sensing elements, a differential amplifier, and signal filters. The differential amplifier is adapted to receive at least one bridge signal from the bridge circuit and is also adapted to emit an output signal. The output signal may be generally proportional to a flow rate of fluid passing through the mass flow controller. The signal filters may be comprised of one or more first filters and one or more second filters adapted to receive the output signal and modify the signal in order to provide a quicker and a more accurate flow rate across multiple fluid types. For example, each of the one or more first filters may be comprised of substantially permanent parameters adapted to decrease a response time of the output signal for a baseline fluid, while the one or more second filters may comprise variable parameters adapted to decrease any overshoot of the flow rate within the output signal for one or more non-baseline fluids. By implementing the filters, the MFC more quickly produces a more accurate output for baseline and non-baseline fluids.

Another embodiment of a mass flow controller is comprised of a mass flow sensor and signal filters. The mass flow sensor configured to provide a flow signal that is indicative of a flow rate of a fluid. The filters are comprised of device-specific filters and fluid-specific filters. The device-specific filters are configured to modify the flow signal based upon specific physical attributes of the mass flow controller and include persistent parameters that are substantially independent of the type of fluid that is controlled by the mass flow controller. The fluid-specific filters are configured to modify the flow signal based upon the specific fluid that is controlled by the mass flow controller, with the fluid-specific filters utilizing parameters that are dependent upon the specific fluid that is controlled by the mass flow controller.

Another embodiment of the present invention which is adapted to provide a quick and accurate MFC flow rate output across multiple fluid types is a signal modification system. One signal modification system is comprised of an input, a first group of digital filters, a second group of digital filters, and an output. The input in one signal modification system is adapted to receive an output signal from a differential amplifier, where the differential amplifier output signal is generally proportional to a flow rate of a fluid in a mass flow controller main flow line. The first group of digital filters is adapted to modify the differential amplifier output signal so that the output signal more quickly provides an accurate reading of the flow rate upon a flow rate change occurring in the main flow line for at least a baseline fluid. The second group of digital filters is adapted to further modify the output signal, with the second group of digital filters being adapted to alter the modified output signal for fluid types other than the baseline fluid. The output is adapted to emit the modified output signal upon application of the first and second digital filters.

Another embodiment of the present invention is a method of producing a signal from a mass flow controller. The method is adapted to provide quicker and more accurate responses from the MFC across multiple fluid types. One embodiment of the method is comprised of emitting a signal from a differential amplifier, modifying the signal, and then outputting the modified signal. The signal emitted from the differential amplifier is generally proportional to a flow rate of a fluid in the mass flow controller. The emitted signal is modified through the application of one or more first digital filters and one or more second digital filters. Each of the one or more first digital filters comprises a pair of parameters obtained through tuning of the mass flow controller, with the first digital filters being adapted to provide a more accurate flow rate for at least a baseline fluid. The one or more second digital filters comprise gas-specific digital filters adapted to provide a more accurate flow rate for non-baseline fluids.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
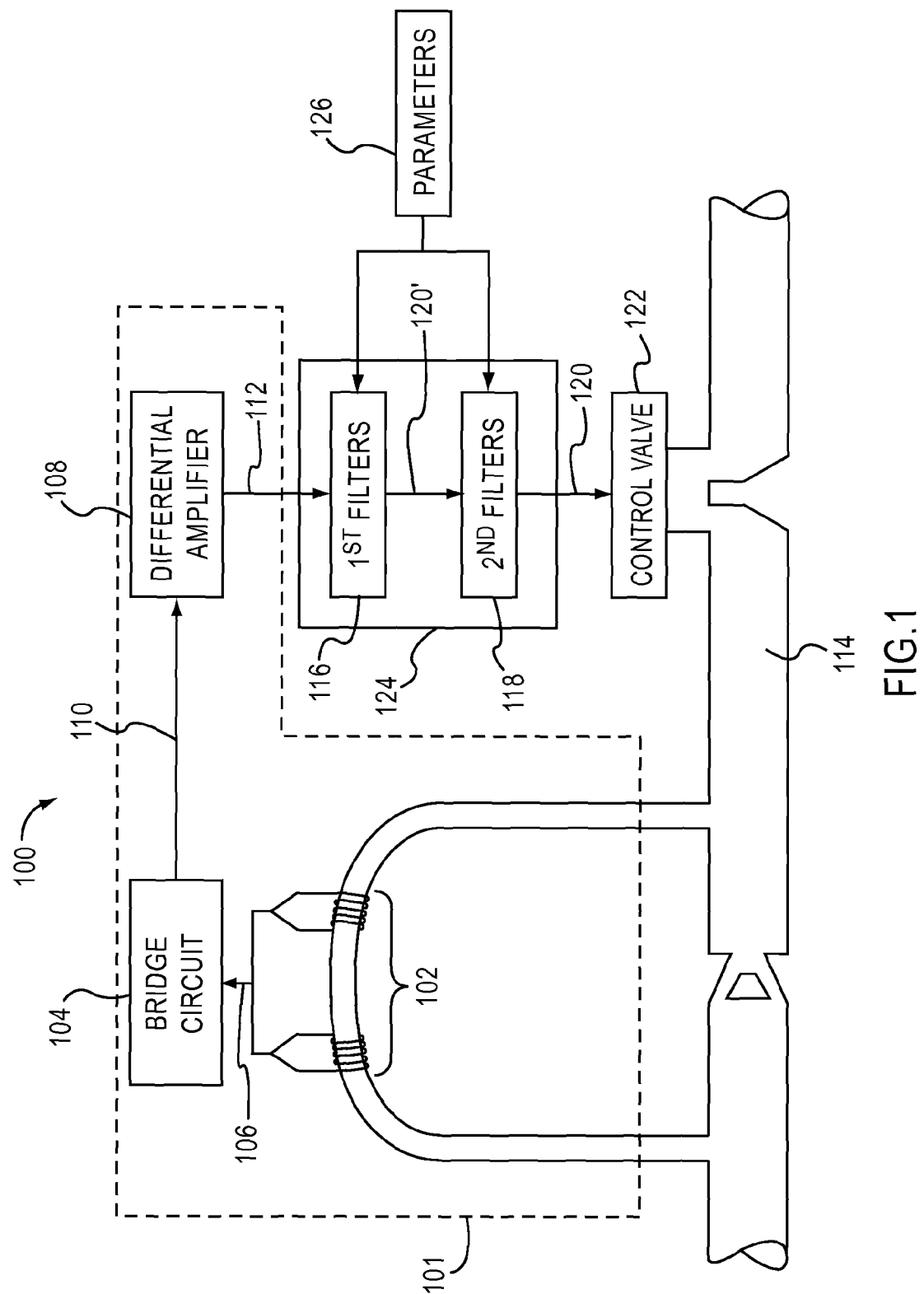
FIG. 1 is a schematic representation of a mass flow controller in accordance with an illustrative embodiment of the invention.

Referring now to the drawings, where like or similar elements are designated with identical reference numerals throughout the several views where appropriate, and referring in particular to FIG. 1, shown is a mass flow controller 100 adapted to provide an improved fluid flow reading upon a flow rate change. Although prior art embodiments, such as U.S. Pat. Nos. 7,272,512, 7,363,182, and 7,380,564, and U.S. Pat. App. Nos. 20080059084 and 20080140260 comprise MFCs that are adapted for use in multi-gas applications, none of the embodiments consider thermal flow sensor response as a potential source of poor performance across various gasses. Contrastingly, in embodiments of the present invention, flow sensor response is used to improve MFC performance across the gasses.

One mass flow controller 100 comprises a pair of thermal sensing elements 102 and a bridge circuit 104 adapted to receive at least one first signal 106 from the pair of thermal sensing elements 102. One embodiment may receive one signal from each of the elements. The mass flow controller 100 may also be comprised of a differential amplifier 108 adapted to receive at least one bridge signal 110 from the bridge circuit 104. The differential amplifier 108 is also adapted to emit an output signal 112 generally proportional to the flow rate of fluid passing through the main flow line 114 of the mass flow controller 100.

Figure 4:
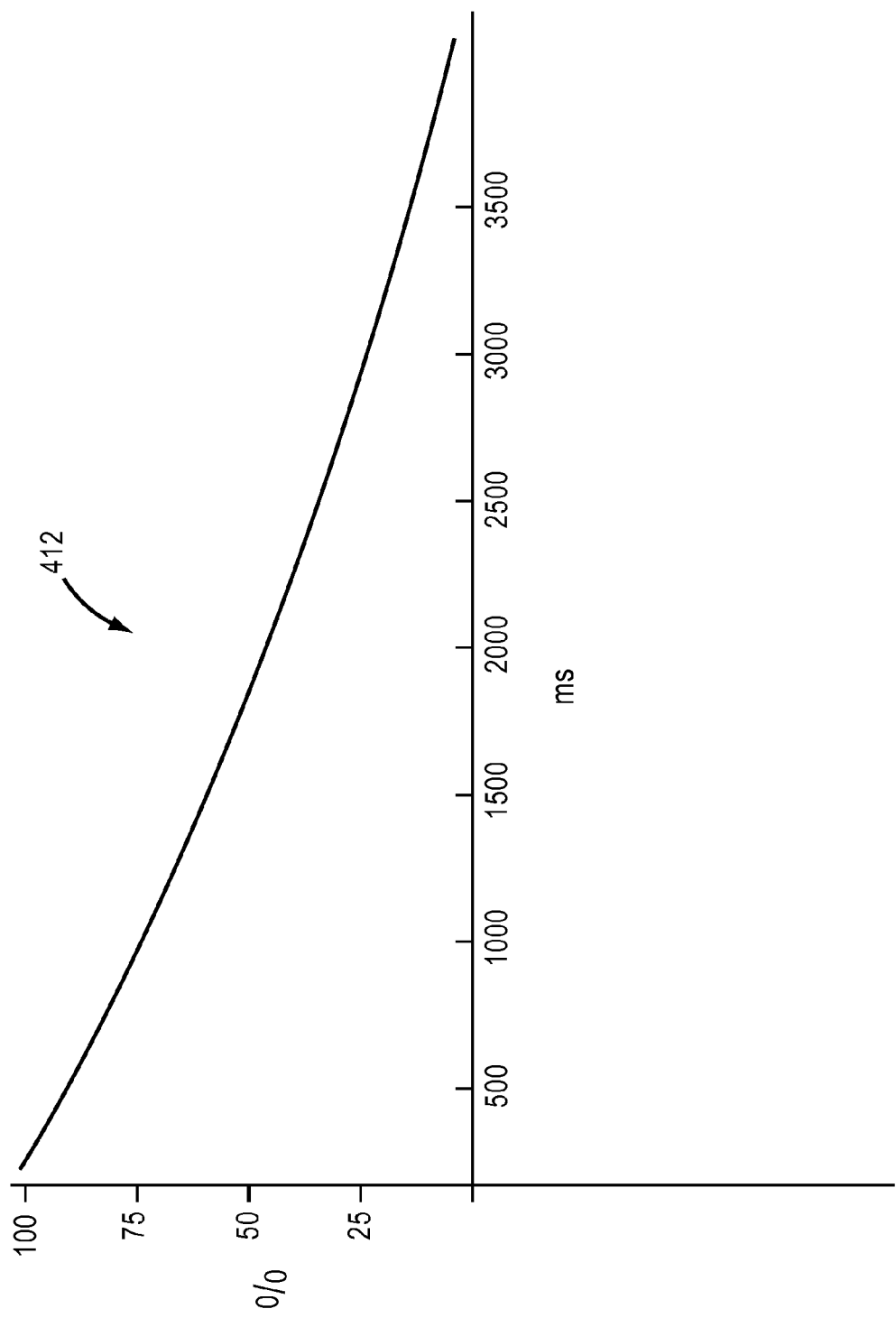
FIG. 4 is a graphical representation of the difference in measured flow rate as compared to actual flow rate as a function of elapsed time from a flow rate change, as output by a differential amplifier for a baseline gas in accordance with an illustrative embodiment of the invention.

Seen in FIG. 4 is a representation of the output 112 of the differential amplifier 108 upon a decrease in flow rate of the fluid in the main flow line 114 from 100% of full scale flow to 0% of full scale flow. FIG. 4 shows the difference in measured flow rate from actual flow rate (in % of full scale flow) as a function of the time elapsed from the change in flow rate (in ms). As seen, prior to the application of filters 116, 118 to the output 112, the flow rate measured by the thermal sensor 101 lags behind the actual flow rate. This may be due to the temperature of thermal elements 102 failing to adapt quickly enough to the flow rate change. In FIG. 4, after about 500 ms, in one embodiment, the measured flow rate is about 80% of full scale flow, about 60% greater than full scale after about 1 s, and still about 20% of full scale after about 3.5 s from the change in flow rate. These measurements may be higher or lower in other embodiments and may be at least partially MFC and/or fluid-dependent.

In one embodiment, FIG. 4 is representative of a baseline fluid such as, but not limited to, Nitrogen ($N_2$) gas. However, other baseline fluids may also be used. One baseline fluid may be the fluid used to "tune" the MFC upon manufacture. For example, Nitrogen may be used in on MFC to obtain ideal first filter parameters. Ideal parameters in one embodiment are parameters 126 which provide the quickest and most accurate flow rate measurement for the MFC & gas tested.

Returning to FIG. 1, one or more first filters 116 and one or more second filters 118 may be serially-aligned filters adapted to modify the output signal 112 and create a final modified output signal 120. The output signal 112 may be converted from an analog signal to a digital signal through an analog-to-digital converter (ADC) in one embodiment prior to the filters 116, 118 receiving the output signal 112. In one embodiment, the filters 116, 118 comprise a filter portion 124 of a control module adapted to receive the output signal 112. The output signal 112 comprises a digital signal and the filters 116, 118 may comprise one or more digital signal modifications. For example, each of the one or more first filters 116 may comprise a signal modifier having one or more substantially permanent parameters. The substantially permanent parameters in one embodiment are parameters 126 which are adapted to adjust the output signal 112 so that the output signal 112 more closely reflects the flow rate of the baseline fluid in the main flow line 114 upon a flow rate change. Many first and second filters 116, 118 and the parameters 126 comprising the filters include data stored as software and/or firmware within the filter portion 124 of the control module. The control module may comprise various other portions besides the filter portion 124.

One embodiment may comprise five first filters 116 coupled in series, with each of the first filters 116 having two parameters 126. However, a greater or lesser number of filters 116 and parameters 126 are contemplated. The two first filter parameters may be determined through empirical data such as, through the tuning of the MFC. Although in many embodiments, the first filter parameters are substantially permanent parameters, in other embodiments, the first filter parameters may be parameters 126 that are re-entered upon additional tuning of the MFC 100.

Figure 5:
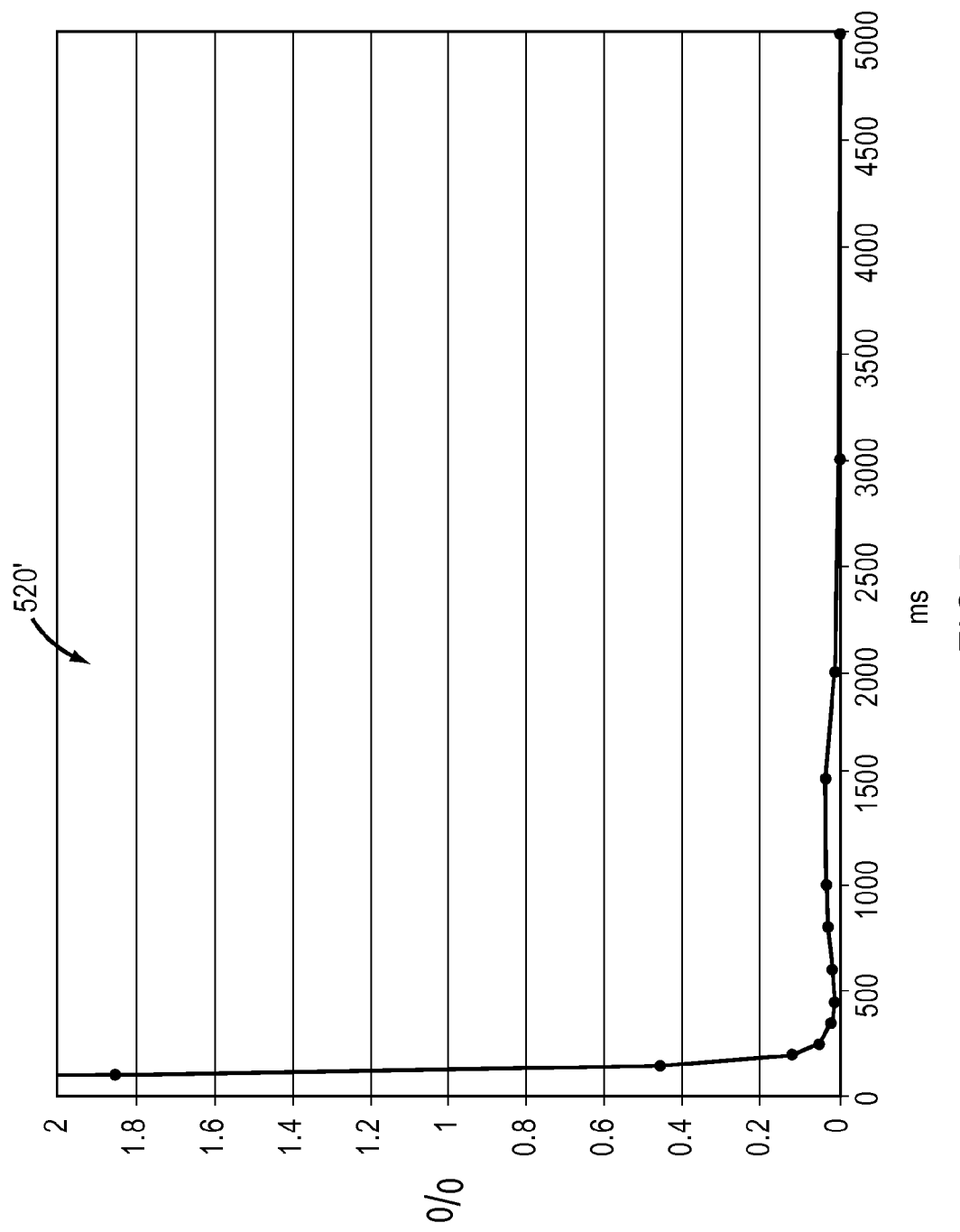
FIG. 5 is a graphical representation of the difference in measured flow rate as compared to actual flow rate as a function of elapsed time from a flow rate change, as output by one or more first filters for a baseline gas in accordance with an illustrative embodiment of the invention.

FIG. 5 is a representation of the output signal 112 after application of the first filters 116 to create an initial modified output signal 120', 520'. Similar to FIG. 4, FIG. 5 is a representation of the initial modified output signal 520' upon decrease in flow rate of the baseline fluid in the main flow line 114. However, the vertical scale in FIG. 5 is from 0% to 2%, as the change in flow rate from 100% to 2% has been omitted from FIG. 5 (as well as FIGS. 6 & 7). FIG. 5 shows that the measured flow rate is only 0.2% greater than the actual flow rate less than 250 ms after the change in flow rate occurs. Therefore, the first filters 116 in one embodiment enable the MFC 100 to more quickly produce a more accurate measured flow rate for the baseline fluid upon a flow rate change.

Figure 6:
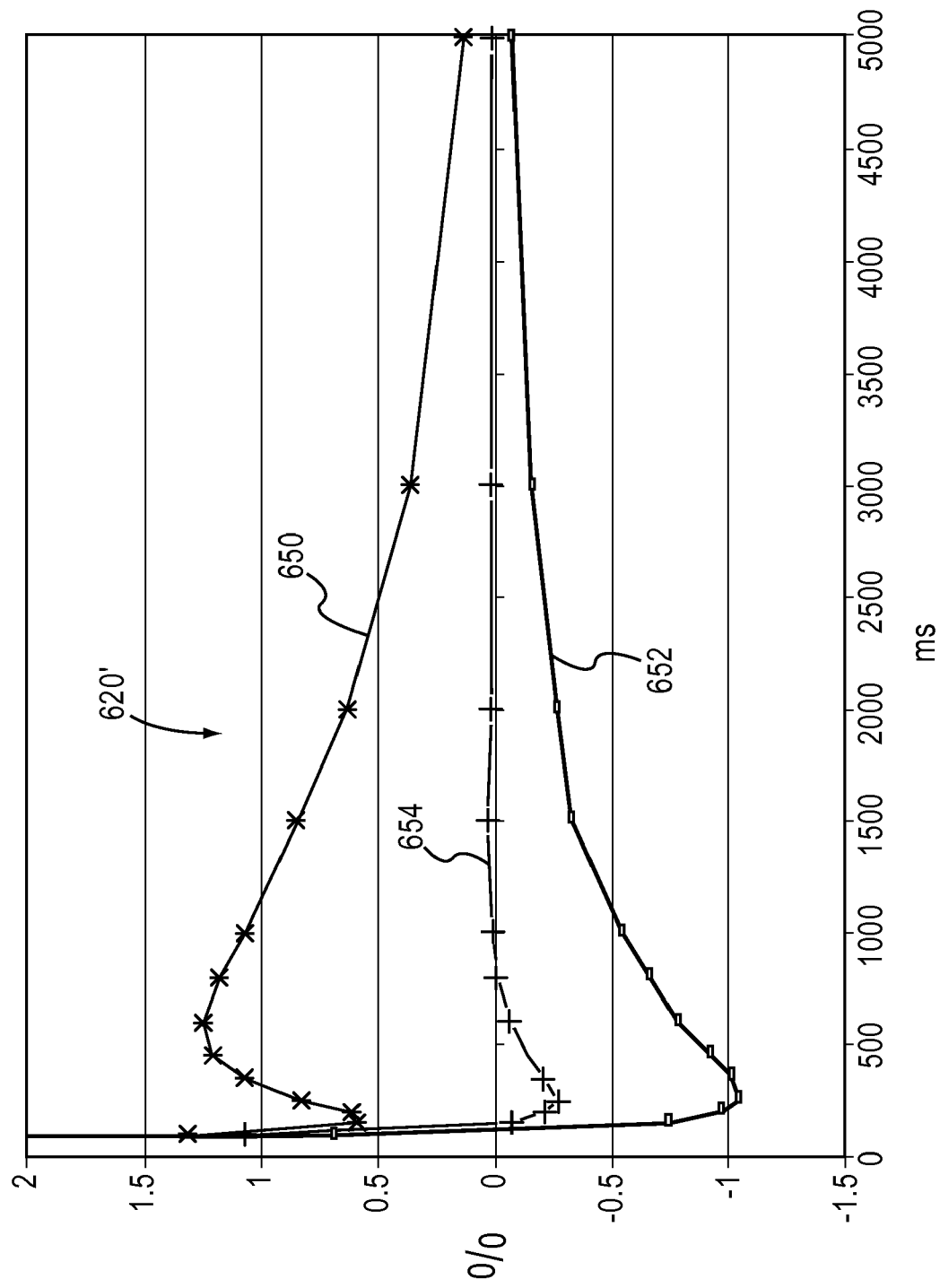
FIG. 6 is a graphical representation of the difference in measured flow rate as compared to actual flow rate as a function of elapsed time from a flow rate change, as output by one or more first filters for three non-baseline gases in accordance with an illustrative embodiment of the invention.

However, application of the first filters 116 and their first parameters to fluids other than the baseline fluid may result in an initial modified output 120' that fails to produce a more accurate measured flow rate. For example, seen in FIG. 6 is the application of the first filters 116 to three non-baseline fluids 650, 652, 654. Comparing the results in FIG. 6 to the results in FIG. 5 shows that the first filters 116 fail to produce substantially similar improved output for non-baseline fluids 650, 652, 654.

In order to correct the initial modified output 120' so that a more accurate flow rate is produced for non-baseline fluids 650, 652, 654, the initial modified output 120' is sent through one or more second filters 118 in one embodiment, as seen in FIG. 1. The one or more second filters 118 may be comprised of one or more variable parameters. The variable parameters may comprise parameters 126 that are adapted to be adjusted. Furthermore, each of the one or more second filters 118 may only be adapted to one or more fluid types. For example, in one embodiment, the MFC 100 may be adapted to operate with thirty fluid types other than the baseline fluid (other MFCs 100 may be adapted to operate with more or less fluid types).

Figure 7:
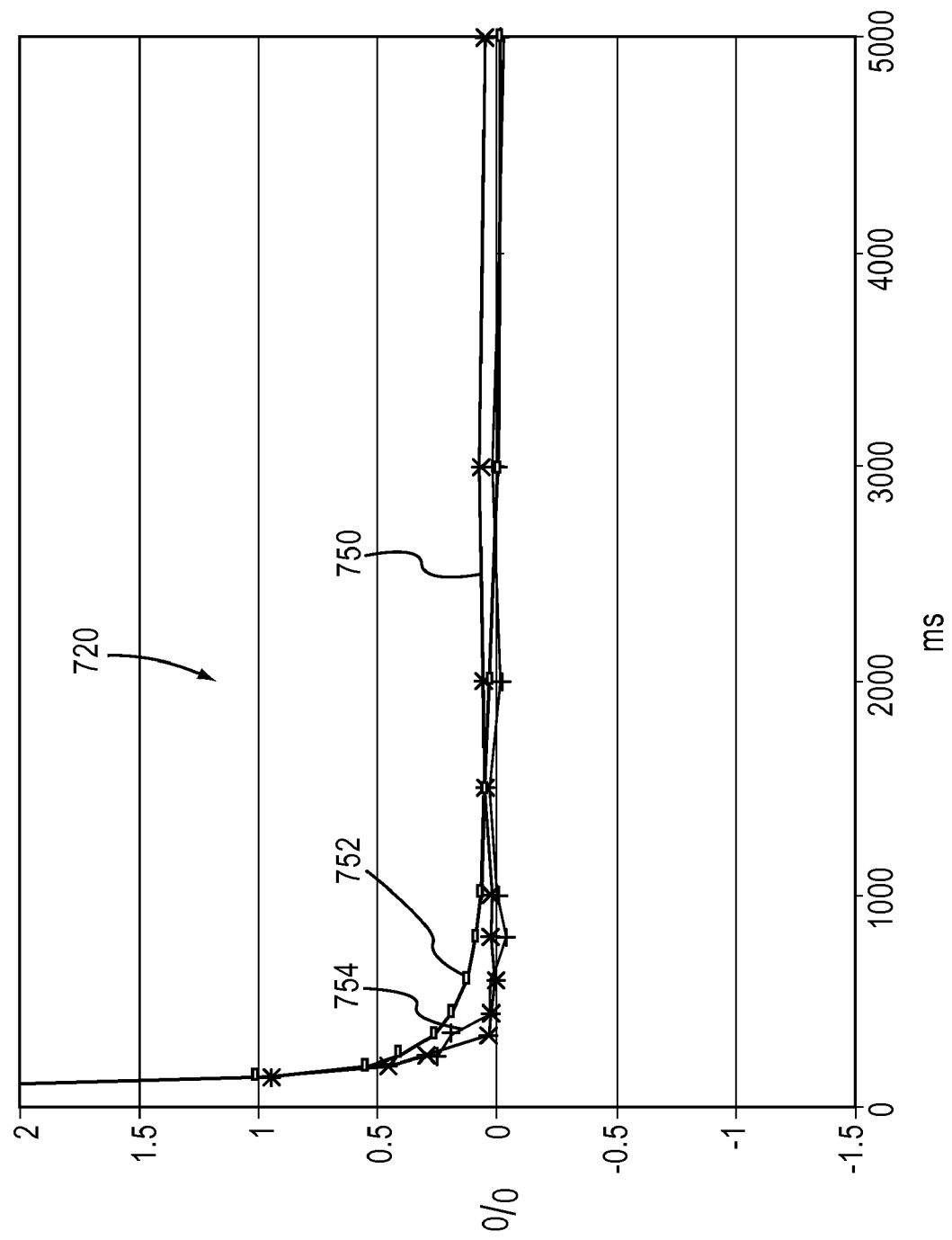
FIG. 7 is a graphical representation of the difference in measured flow rate as compared to actual flow rate as a function of elapsed time from a flow rate change, as output by one or more second filters for three non-baseline gases in accordance with an illustrative embodiment of the invention.

In one embodiment, each of the second filters 118 comprises two parameters 126. The two parameters 126 in each filter 118 may be adjusted for the baseline fluid so that all second filters 118 are adapted to allow the initial modified output signal 120' pass through the filters 118 without modification. For example, the parameters 126 of the second filters 118 may equal zero in one embodiment for the baseline fluid. Upon changing the fluid in the MFC 100 to a first non-baseline fluid 650, the parameters 126 of the second filters 118 may be modified. Such a modification of the second filters 118 may change the initial modified output 620', as seen in FIG. 6, for a first non-baseline fluid 650 to a final modified output 720, as seen in FIG. 7, for the first non-baseline fluid 750.

Subsequently, upon a further change in fluid type flowing through the main flow line 114 from the first non-baseline fluid 650 to a second non-baseline fluid 652, the variable parameters of the second filters 118 may be modified so that the second filters 118 are adapted to modify the initial modified output signal 120' for the second non-baseline fluid 652. Therefore, the measured flow rate for the second non-baseline fluid 652 as seen in FIG. 6 is changed from the initial modified output signal 620' to the final modified output 752 seen in FIG. 7. As seen with the second non-baseline fluid 752, the second filters 118 are not only adapted to decrease, but may potentially eliminate any overshoot of the actual flow rate present in the measured flow rate for the second non-baseline fluid 752. In one embodiment, the decrease in flow rate overshoot comprises a flow rate overshoot no greater than 1% of the flow rate across all fluids.

As shown, the initial modified output signal 120' may be modified for a variety of fluids to more quickly produce a more accurate measured flow rate. In a similar manner, the MFC may return to the baseline fluid after a non-baseline fluid is used. FIGS. 6 & 7 also show the application of the second filters 118 on a third non-baseline fluid 654, 754. The parameters 126 for the second filters 118 may comprise the ideal parameters for a fluid such as, but not limited to, Xenon (Xe), used in a MFC to quickly produce an accurate flow rate reading. Similarly, the second filter parameters may be adjusted for a fluid such as, but limited to, Oxygen ($O_2$) to quickly produce an accurate flow rate reading.

The second filter parameters may be obtained for many fluids through empirical methods. For example, the parameters 126 for the second filters may be obtained through testing of a single unit. In other embodiments, the parameters 126 may be modified across MFCs 100. Furthermore, the second filter parameters may be modified based on various gas properties. Additionally, the second filter parameters may be determined from gas properties for various fluids such as, but not limited to, highly volatile or flammable fluids. Similarly, each applied second filter 118 may be different.

Upon application of the one or more second filters 118, the modified output signal 120 is produced, which is a more accurate signal and is more responsive to changes for non-baseline fluids in the flow rate as compared to the initial modified output signal 120' and output signal 112. Upon application of the second digital filters 118, the final modified output signal 120 is sent to a control valve 122 from the filter portion 124 of the control module in one embodiment. The control valve 122 is adapted to receive the signal and adjust the valve 122 to allow more or less fluid through the main flow line 114. By more quickly providing a more accurate signal 120 to the control valve 122, the control valve 122 is less likely to inappropriately modify the flow rate in the main flow line 114. For example, oscillation about a specified flow rate is less likely to occur and overshoot and undershoot of the flow rate is less likely to occur.

One mass flow controller 100 may comprise a mass flow sensor configured to provide a flow signal that is indicative of a flow rate of a fluid. For example the mass flow sensor may comprise the thermal flow sensor 101 seen in FIG. 1 and the flow signal may be the output signal 112. Additionally, the first filters 116 may be referred to as a device-specific filter portion configured to modify the flow signal based upon specific physical attributes of the mass flow controller. Furthermore, the substantially permanent parameters may be referred to as persistent parameters that are substantially independent of the type of fluid that is controlled by the mass flow controller. The second filters 118 may be referred to as a fluid-specific filter portion, with the fluid-specific filter configured to modify the flow signal based upon the specific fluid that is controlled by the mass flow controller. The fluid-specific filter portion may utilize parameters that are dependent upon the specific fluid that is controlled by the mass flow controller. The plurality of device-specific filters comprising persistent parameters may be substantially independent of the type of fluid that is controlled by the mass flow controller. Furthermore, the fluid-specific filter portion may include a plurality of filter utilizing parameters that are dependent upon the type of fluid that is controlled by the mass flow controller. Finally, the mass flow controller 100 may include a memory comprising the fluid parameters 126 for a plurality of different fluid types, wherein the fluid-specific filter portion is configured to obtain, from the memory, particular fluid parameters for a particular fluid and utilize the particular fluid parameters to modify the flow signal.

Figure 2:
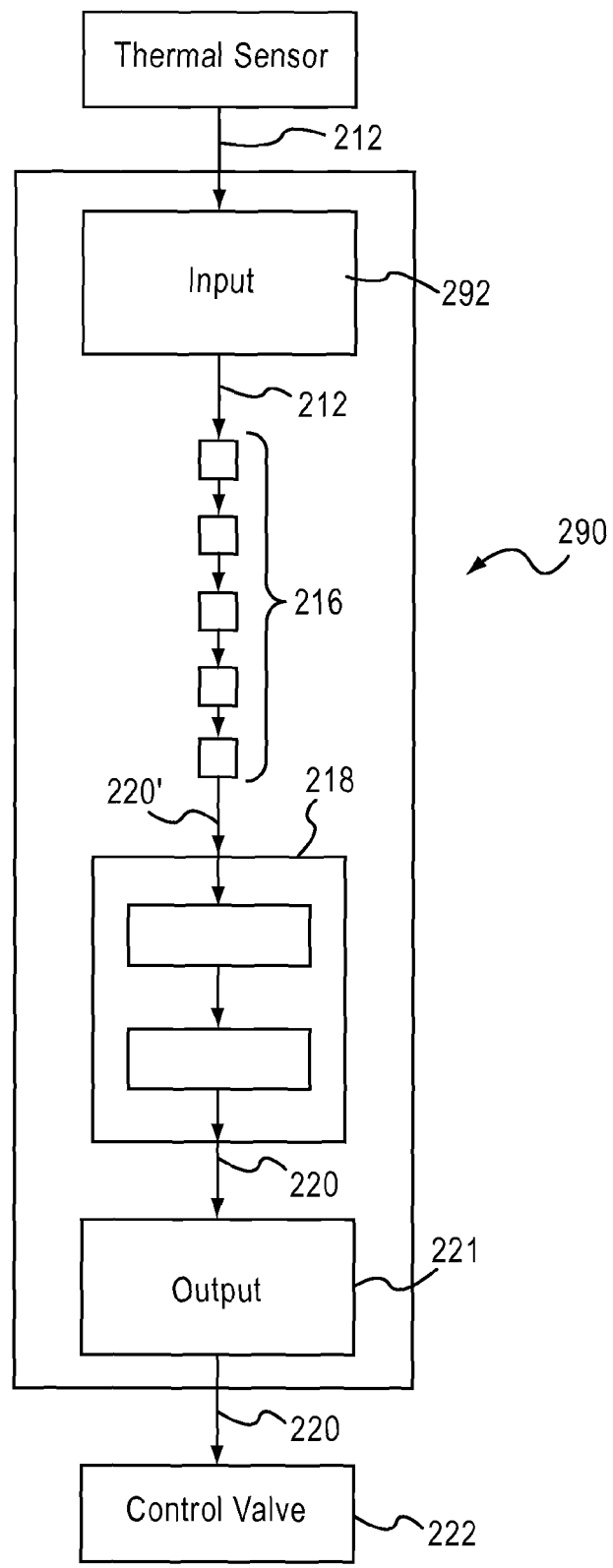
FIG. 2 is a schematic representation of a signal modification system in accordance with an illustrative embodiment of the invention.

Turning now to FIG. 2, shown is a representation of a MFC signal modification system 290. One signal modification system 290 is adapted to increase the accuracy of a MFC fluid flow rate measurement. One embodiment of a signal modification system 290 is comprised of an input 292 adapted to receive an output signal 212 from a thermal sensor 201. The output signal 212 received by the signal modification system of FIG. 2 may be generally proportional to the fluid flow rate in the mass flow controller main flow line 114.

The signal modification system 290 is also comprised of a first group of serially-aligned digital filters 216 adapted to modify the output signal 212 and produce an initial modified output signal 220' upon application of all the filters 216. One initial modified output signal 220' provides a more accurate reading of the flow rate as compared to the flow rate in the output signal 212, for at least a baseline fluid, upon a flow rate change occurring in the main flow line 114. The first filters 216 in one embodiment comprise at least one of firmware and software.

A second group of digital filters 218 may be adapted to further modify the output signal 212 for non-baseline fluids by altering the initial modified output signal 220'. Each of the second group of digital filters 218 may be adapted to alter the initial modified output signal 220' for various non-baseline fluid types. Upon a fluid change from a first non-baseline fluid to a second non-baseline fluid, the second filters 218 may be adapted to modify the initial modified output signal 220' for the second non-baseline fluid. In addition to the second filters 218, the system 290 is also comprised of an output 221 adapted to emit the final modified output signal 220 to the control valve. One embodiment of a system 290 comprises a second group of digital filters having two gas-dependent parameters 126. The two gas-dependent parameters may be determined through at least one of empirical methods and gas properties.

In one embodiment of a signal modification system 290, when the flow rate in the main flow line 114 changes for a baseline fluid, the flow rate after the change is comprised of a second flow rate (with the flow rate prior to the change comprising a first flow rate). Upon the flow rate change the final modified output signal 220 is adapted to output a measured flow rate with no greater than a 0.1% overshoot of the second flow rate. This low overshoot level is adapted to be output in one embodiment upon application of the first group of digital filters 216 which comprise parameters 126 adapted for calibration for each mass flow controller device.

Figure 3:
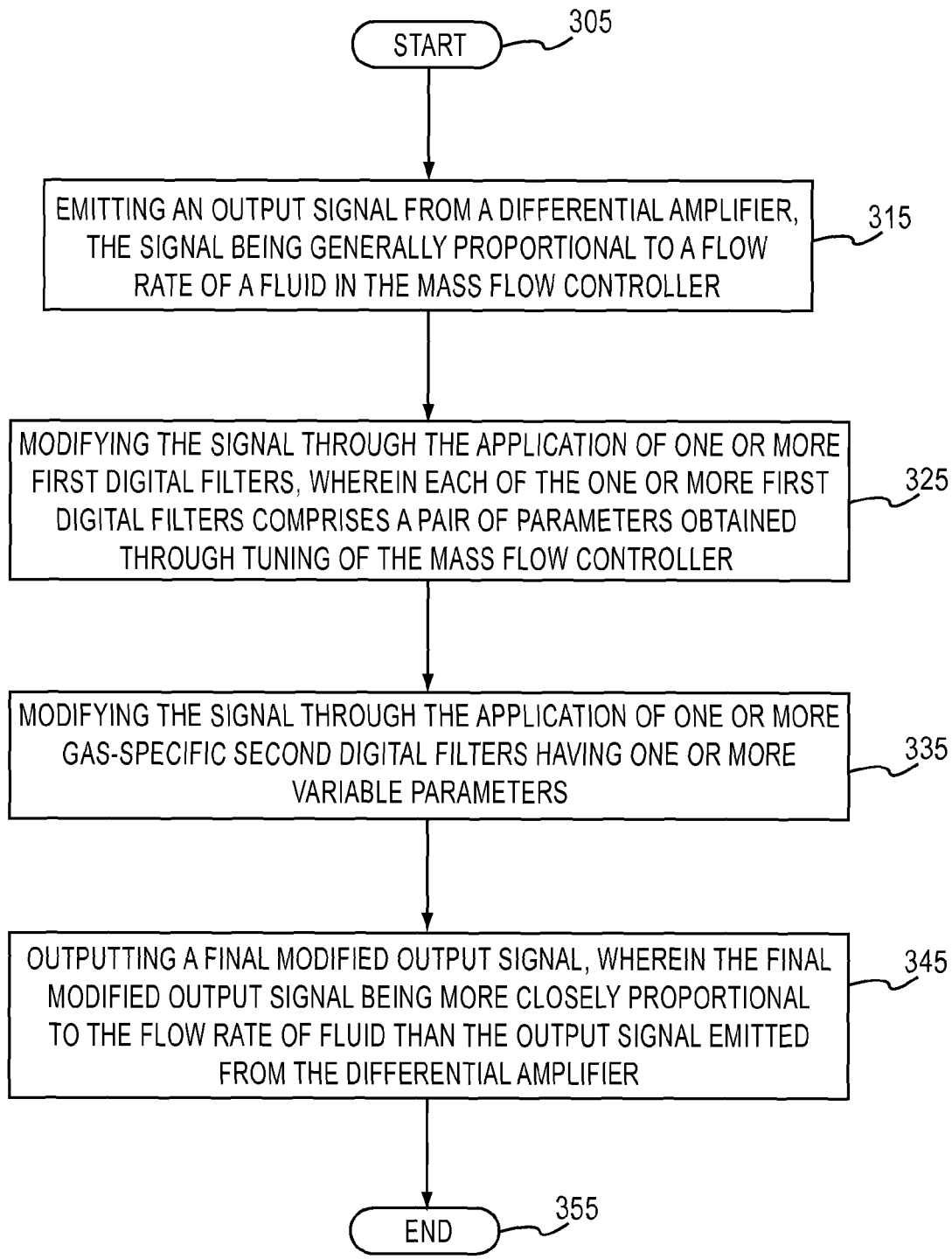
FIG. 3 is a flow chart of a method of outputting a signal from a mass flow controller in accordance with an illustrative embodiment of the invention.

In turning now to FIG. 3, shown is a method of producing a signal from a mass flow controller 100. In starting the method at 305, one embodiment at 315 comprises emitting an output signal from a differential amplifier. For example, one embodiment may comprise emitting the output signal 112 from the differential amplifier 108 of the MFC 100 shown in FIG. 1. The signal 112 in one embodiment may be generally proportional to a flow rate of a fluid in the mass flow controller 100. Upon emitting the signal 112 from the differential amplifier 108, at 325, the signal is modified through the application of one or more first digital filters 116. Each of the one or more first digital filters 116 in one embodiment comprises a pair of parameters 126 obtained through tuning of the mass flow controller 100. At 335, the signal is then modified through applying one or more gas-specific second digital filters 118 which has one or more variable parameters 126. Each of the filters are serially-aligned in one embodiment.

Finally, at 345, a final modified output signal 120 is output. One final modified output signal is a signal which measures a flow rate that is more closely proportional to the actual flow rate of fluid through the MFC than the flow rate measured in the output signal 112 emitted from the differential amplifier 108. In one method, the measured flow rate in the final modified output signal 120 emitted from the second digital filter comprises less than a 0.1% overshoot of the actual flow rate, and less than a 0.1% undershoot of the actual mass flow rate. In order to provide an accurate signal upon changing the fluid from a first fluid (baseline or non-baseline) to a second fluid (baseline or non-baseline) that is different than the first fluid, in one method one or more parameters 126 in the gas-specific second digital filters 118 that are applied during the flow of the first fluid are modified.

In conclusion, the present invention provides, among other things, a method and apparatus for a gas in a mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A mass flow controller comprising,
a thermal mass flow sensor configured to emit an output signal that is indicative of a mass flow rate of a fluid;
a control valve that regulates the flow rate of the fluid;
a memory that includes substantially permanent parameter values that characterize unique physical attributes of the mass flow controller, and the memory includes a plurality of device-independent variable datasets, each of the plurality of device-independent variable datasets includes device-independent parameter values for a corresponding one of a plurality of non-baseline fluids;
a control module that receives the output signal and modifies the output signal of the thermal mass flow sensor, based on a particular type of non-baseline fluid that is being controlled, to improve a response of the thermal mass flow sensor for each of the plurality of non-baseline fluids when there are changes in mass flow rate, and the control module controls the control valve using the modified output signal that is indicative of a mass flow rate of the fluid, the control module including:
one or more first filters that utilize the substantially permanent parameter values to improve the response of the modified output signal to a change in the mass flow rate for a baseline fluid; and
one or more second filters that modify the output signal utilizing device-independent parameter values from a particular one of the device-independent variable datasets depending upon the particular type of non-baseline fluid that is being controlled to improve the response of the modified output signal to the change in the mass flow rate for the particular type of non-baseline fluid that is being controlled.

2. The mass flow controller of claim 1 wherein, the improved response for the baseline fluid and for a single non-baseline fluid comprises a modified output signal (i) more closely proportional to the mass flow rate of fluid for a specified period of time after the change in mass flow rate, and (ii) having not greater than a 0.1% overshoot in measured mass flow rate as compared to the actual mass flow rate.

3. The mass flow controller of claim 2 wherein,
the specified period of time comprises a period of at least 4 seconds; and
the fluid comprises a gas.

4. The mass flow controller of claim 1 wherein,
the one or more first filters and one or more second filters comprise a filter portion of the control module; and further including,
the control valve adapted to receive a final modified output signal from the filter portion of the control module.

5. The mass flow controller of claim 1 wherein,
the thermal mass flow sensor is comprised of a pair of thermal sensing elements adapted to emit a first signal to a bridge circuit, the bridge circuit adapted to emit a bridge signal to a differential amplifier;
the differential amplifier is adapted to emit the output signal; and
the one or more first filters and the one or more second filters comprise at least one of software and firmware.

6. The mass flow controller of claim 1 wherein,
the baseline fluid comprises a tuning fluid used to obtain the substantially permanent parameter values of the one or more first filters.

7. The mass flow controller of claim 1 wherein,
the substantially parameters parameter values of the one or more first filters are adapted to be obtained on a device-by-device basis; and
the device-independent parameter values are are obtained through empirical methods.

8. The mass flow controller of claim 1 wherein, the one or more first filters and
the one or more second filters are applied in series.

9. A signal modification system comprising,
an input adapted to receive an output signal from a differential amplifier, the output signal being generally proportional to a flow rate of a fluid in a mass flow controller main flow line;
a first group of digital filters adapted to modify the output signal to provide a more accurate reading of the flow rate for at least a baseline fluid upon a flow rate change occurring in the main flow line, the first group of digital filters utilize substantially permanent parameter values that characterize unique physical attributes of the mass flow controller;
a second group of digital filters, wherein each of the second group of digital filters is adapted to alter the output signal for non-baseline fluids, the second group of digital filters utilizing device-independent parameter values from a particular device-independent variable dataset that is selected based upon a particular type of non-baseline fluid that is being controlled to improve the response of the output signal to the flow rate change for the particular type of non-baseline fluid that is being controlled; and
an output adapted to emit a final modified output signal after the output signal is modified by the first and second groups of digital filters.

10. The signal modification system of claim 9 wherein,
the flow rate after the flow rate change comprises a second flow rate; and
the final modified output signal comprises no greater than 0.1% overshoot of the second flow rate upon application of the first and second groups of digital filters.

11. The signal modification system of claim 9 wherein,
the substantially permanent parameters values are determined during calibration of the mass flow controller for the baseline fluid; and
the device-independent parameter values are determined independently of the calibration of the mass flow controller.

12. The signal modification system of claim 9 wherein, the non-baseline fluids include gases.

13. The signal modification system of claim 12 wherein, the device-independent parameter values are determined through at least one of empirical methods and gas properties.

14. A method of producing a signal from a mass flow controller comprising,
emitting an output signal from a differential amplifier, the signal being generally proportional to a flow rate of a fluid in the mass flow controller;
modifying the signal through the application of one or more first digital filters, wherein each of the one or more first digital filters comprises a pair of parameters obtained through tuning of the mass flow controller, values of the pair of parameters characterize unique physical attributes of the mass flow controller;
selecting, from among a plurality of device-independent variable datasets, a particular device-independent variable dataset corresponding to a type of the fluid being controlled by the mass flow controller, each of the plurality of device-independent variable datasets includes device-independent parameter values for a corresponding one of a plurality of non-baseline fluids;
modifying the signal through the application of one or more fluid-specific second digital filters having one or more fluid-type-parameters, the values of the fluid-type-parameters are obtained from the particular selected device-independent variable data set; and
outputting a final modified output signal, the final modified output signal being more closely proportional to the flow rate of fluid than the output signal emitted from the differential amplifier.

15. The method of claim 14 wherein, the first and second digital filters are serially-aligned.

16. The method of claim 14 further comprising, outputting a signal from the second digital filter, wherein the signal output from the second digital filter comprises (i) less than a 0.1% overshoot of an actual mass flow rate, and (ii) a quicker response time to a mass flow rate change than an initial modified output signal emitted by the one or more first filters.

17. The method of claim 14 further comprising, changing a fluid flowing through the mass flow controller from a first non-baseline fluid to a second non-baseline fluid.

18. A mass flow controller comprising:
a mass flow sensor configured to provide a flow signal that is indicative of a flow rate of a fluid;
a control valve that regulates the flow rate of the fluid;
a control module that receives the flow signal and generates a modified output signal that controls the control valve to provide a desired mass flow rate, the control module including:
a device-specific filter portion configured to modify the flow signal based upon specific physical attributes of the mass flow controller, the device-specific filter including persistent parameters that are based upon the specific physical attributes of the mass flow controller and are substantially independent of the type of fluid that is controlled by the mass flow controller, and the persistent parameters improve a response of the modified output signal to a change in the mass flow rate for a baseline fluid; and
a fluid-specific filter portion, the fluid-specific filter configured to modify the flow signal based upon the specific fluid that is controlled by the mass flow controller, the fluid-specific filter portion utilizes fluid-specific parameters that are dependent upon the specific fluid that is controlled by the mass flow controller, and the fluid-specific parameters improve the response to the change in the mass flow rate of the modified output signal for the particular type of non-baseline fluid that is being controlled.

19. The mass flow controller of claim 18, wherein the device-specific filter portion includes a plurality of filters, each of the plurality of filters includes persistent parameters that are substantially independent of the type of fluid that is controlled by the mass flow controller.

20. The mass flow controller of claim 19, wherein the fluid-specific filter portion includes a plurality of filters, each of the plurality of filters utilizes parameters that are dependent upon the type of fluid that is controlled by the mass flow controller.

21. The mass flow controller of claim 19 including a memory comprising fluid parameters for a plurality of different fluid types, wherein the fluid-specific filter portion is configured to obtain, from the memory, particular fluid parameters for a particular fluid and utilize the particular fluid parameters to modify the flow signal.

* * * * *